United States Patent [19]

Steiger

[11] Patent Number: 4,474,559
[45] Date of Patent: Oct. 2, 1984

[54] HOME PARENTERAL NUTRITION TRAINER

[75] Inventor: Ezra Steiger, Beachwood, Ohio

[73] Assignee: The Cleveland Clinic Foundation, Cleveland, Ohio

[21] Appl. No.: 471,801

[22] Filed: Mar. 3, 1983

[51] Int. Cl.³ .............................................. G09B 23/28
[52] U.S. Cl. ..................................................... 434/268
[58] Field of Search ................ 434/262, 265, 267, 268

[56] References Cited

U.S. PATENT DOCUMENTS

| | | | |
|---|---|---|---|
| 2,871,584 | 2/1959 | Poole | 434/268 |
| 3,152,404 | 10/1964 | Cheshire | 434/265 |
| 3,529,363 | 9/1970 | Versaci | 434/268 |
| 3,710,454 | 1/1973 | Mellor | 434/268 |
| 4,182,054 | 1/1980 | Wise | 434/268 |

*Primary Examiner*—Harland S. Skogquist
*Attorney, Agent, or Firm*—George F. Bethel; Patience K. Bethel

[57] ABSTRACT

The following specification sets forth a parenteral nutrition trainer. The trainer specifically incorporates a water and stain resistant chest shield with adjustable straps. A storage pouch is fitted to the underside of the chest shield. The shield is formed in a bib-like manner in conjunction with adjustable straps. A training catheter is affixed to the chest shield to simulate an actual implanted catheter. The catheter exits the chest shield in a location where it would normally be used. The catheter is capped with a screw fitting closure that can be used in conjunction with a syringe for training purposes. The catheter extends a distance behind the shield to a plastic fluid receptacle. When not in use, the catheter tubing with its fluid receptacle can be coiled and placed in a storage pouch behind the shield or bib.

19 Claims, 10 Drawing Figures

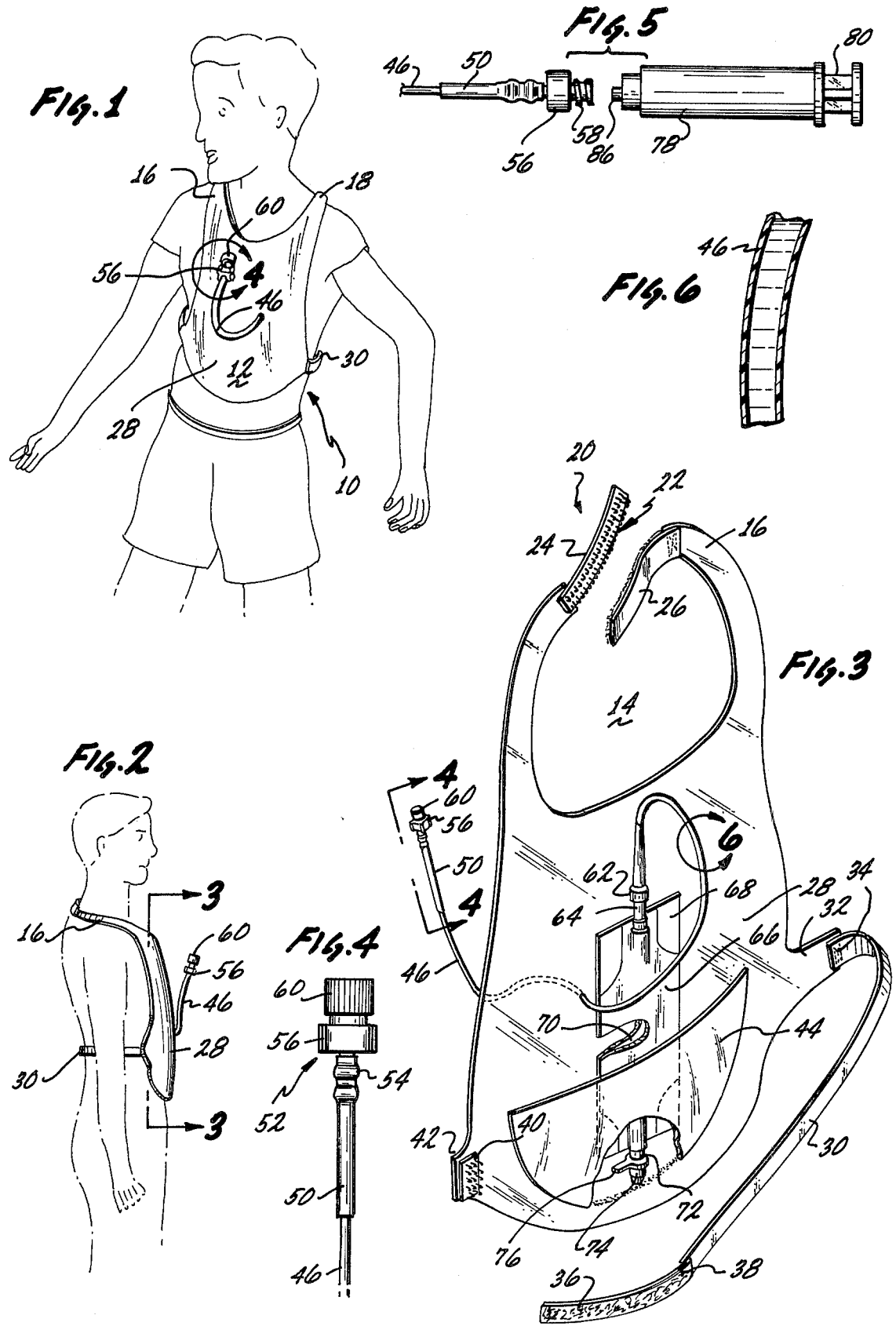

HOME PARENTERAL NUTRITION TRAINER

BACKGROUND OF THE INVENTION

1. Field of the Invention

The field of this invention lies within the medical arts. More specifically, it resides within the total parenteral nutrition or intravenous hyperalimentation technology and field. This field incorporates the feeding of essential nutrients intravenously directly into the blood stream.

The specific area in which this invention is directed toward, is the training of home parenteral nutrition patients in the proper asceptic handling and maintenance of their permanent in-dwelling central venous catheters. The device provides for this in the manner as set forth hereinafter to solve the problems of the prior art with regard to training such home parenteral nutrition patients.

2. Background of the Invention

There has been a long standing need that has been recognized for parenteral means of providing calories in excess of five hundred to seven hundred calories. The provision should be safely provided by the peripheral intravenous infusion of five percent dextrose solutions that have been standard for many years. Higher concentrations frequently cause inflammation of the veins and even thrombophlebitis.

Oftentimes, there are patients with severe bowel disorders whose G.I. tracts require complete bowel rest to heal properly. Other patients have been debilitated to the extent where their lean muscle masses have wasted away during years of cardiac decompensation. Furthermore, newborn infants with chronic diarrhea or congenital G.I. anomalies oftentimes require feeding through parenteral nutrition.

In addition to the foregoing types of patients, some suffer from generalized sepsis, trauma, or cancer and cannot, or should not take enough food by mouth to meet the enormous metabolic needs created by their diseased state.

All of the foregoing patients have been generally starving to one extent or the other while not receiving the nutrients and quantities of nutrition that they would require to save their life.

Without proper nutrition, such consequences of weight loss, muscular weakness, poor wound healing, reduced immunocompetence, increased likelihood of post operative complications, increased morbidity, mortality and generally impeded recovery from primary illnesses takes place. Therefore, the infusion of high volumes of properly balanced nutritional fluids is extremely important.

To this extent, total parenteral nutrition or intravenous hyperalimentation has been used to feed essential nutrients intravenously. This specific technique is used when gastrointestinal tracts as set forth above cannot accurately adjust and absorb sufficient nutrients to meet nutritional requirements.

Each day the body must be supplied with adequate amounts of carbohydrates, proteins, fats, vitamins, minerals, and water. To this extent, a solution is necessary with the foregoing for purposes of feeding into the body. Such total parenteral nutrition solutions (i.e. comprising dextrose or glucose, amino acids, vitamins, minerals and fatty acids, along with proscribed dietary supplements) provide the nutrients to the body through the solution.

In order to implace the solution in the body, use of a catheter is implaced within a large vein close to the heart. Use of a central vein is necessary to prevent thrombosis or clotting which would occur if a smaller peripheral vein in the hand or arm were used.

The feeding of solutions has been used in hospitals since 1966 and has been successfully adapted for use at home.

Such usage generally consists of a surgically implaced silastic catheter into a large bore central vein. Sterile solutions are pumped through the vein by an electric infusion pump which controls the rate.

All the foregoing is of no consequence to a person trying to learn to feed oneself at home without proper training. As a consequence, the inventor has found that as a practical solution for teaching one to use home parenteral nutrition, it is necessary that they be trained properly. This is necessary for a number of reasons.

Firstly, care in the use and maintenance of the implanted catheter helps to prolong its life. Secondly, significant infections can develop around the catheter if care and training is not utilized.

A very important aspect is that between infusions, the catheter may become clotted with blood. This must be prevented by instilling Heparin, a medication that prevents blood from clotting. The Heparin must be implaced in the catheter in a discrete manner and sealed properly. In addition thereto, a particular step function must be utilized with regard to the utilization of clamping the catheter off to prevent undesirable results, either during the instilling of the Heparin or the other utilization of the catheter.

In order to provide a person with the catheter, it is threaded by using a sterile surgical technique in the operating room. An incision is made over the appropriate vein. The catheter is then threaded through the vein into the subclavian vein until the tip of the catheter enters the super vena cava. To help place the catheter tip accurately, an X-Ray unit is used in the operating room.

The other end of the catheter is tunnelled under the skin and exits near the middle of the chest and incorporates a dacron velour cuff that lies under the skin in order to allow the body tissue to grow into the cuff and anchor the catheter.

Once the catheter is implaced and covered with a cap known as a Luer-Lok, the patient is then ready to receive parenteral nutrition, or intervenous hyperalimentation which shall be interchangeably used in this specification.

Before using the catheter for feeding through a pump, the patient must become aware of how to use the catheter. It is this particular training device which allows patients to do that, and be placed at home in a situation where they can feed themselves through the pumping and utilization of parenteral nutrition fluids.

The foregoing training is one which takes place in the manner hereinafter set forth in combination with the process and invention hereof.

The specific trainer of this invention allows for one to train oneself for the prospective use of home parenteral nutrition feeding apparatus so that the end result is a well trained, confident patient who can feed oneself at home through the various procedures required. As a consequence, this invention is a substantial step over the prior art in helping patients feed themselves through parenteral nutrition to add longevity and health to their lives.

SUMMARY OF THE INVENTION

In summation, this invention comprises a parenteral nutrition training device having a chest shield with adjustable straps and a training catheter affixed to the chest shield with appropriate support apparatus.

The chest shield or bib has adjustable straps that are connected to the chest shield and is adjustable by velcro or other means for adjustability. A storage pouch is fitted to the back of the chest shield or bib.

In order to allow for a patient to be trained with the device, a training catheter is affixed to the chest shield to simulate an actually implanted catheter. The catheter exits the chest shield in the appropriate position for training purposes.

In order to close the catheter and teach one to use the device, it is capped with a closure that is referred to in the industry as a Luer-Lok closure.

The catheter extends a significant distance behind the shield terminating in a plastic fluid receptacle. When not in use, the catheter tubing with its fluid receptacle can be coiled and placed in the storage pouch.

In order to practice usage of the trainer, a padded hemostat is utilized as well as certain fluids and a syringe for use of a training solution or fluid.

Through the foregoing, a patient can then be instructed in the proper procedures for applying a dressing to the catheter exit, proper clamping techniques, heparinizing, capping the catheter, connecting and disconnecting fluid administration tubing, and irrigating the catheter. These foregoing training functions and the specification shall be detailed hereinafter.

DESCRIPTION OF THE DRAWINGS

The invention will be more clearly understood by reference to the description below taken in conjunction with the accompanying drawings wherein:

FIG. 1 shows a patient with the training device of this invention;

FIG. 2 shows a side elevation view of a patient with the training device of this invention;

FIG. 3 shows a rear perspective view of the training device of this invention as shown in the direction of lines 3—3 of FIG. 2;

FIG. 4 shows the cap means for the catheter as detailed in the direction of lines 4—4 of FIG. 3;

FIG. 5 shows a view of a syringe cooperatively to be used with a catheter in its opened position;

FIG. 6 shows a sectional view of the catheter as encircled through circle 6 of FIG. 3;

DESCRIPTION OF THE PREFERRED EMBODIMENTS

Figure 7:
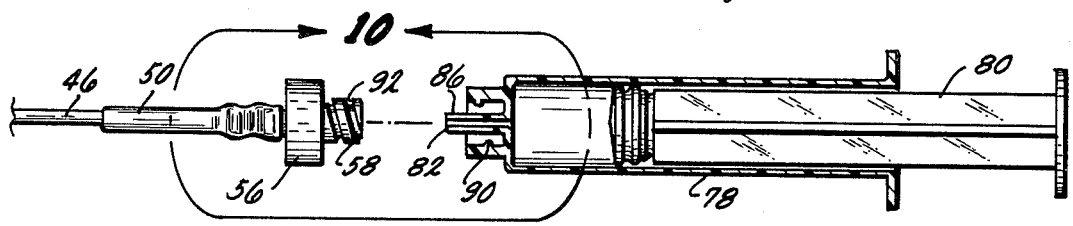
FIG. 7 shows a syringe being used with the catheter and the locking end thereof.
Figure 8:
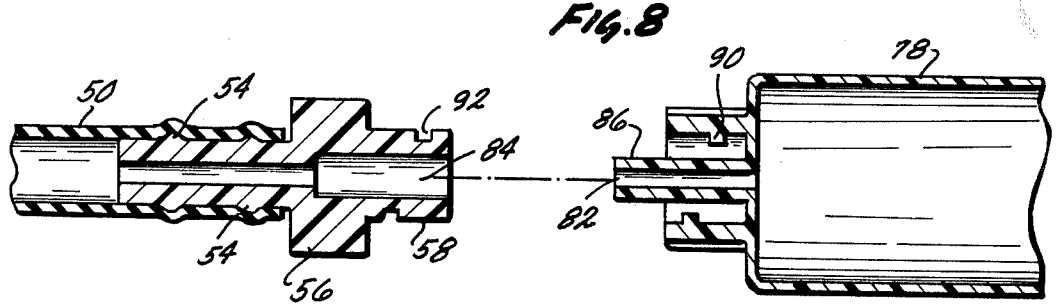
FIG. 8 shows a partially sectioned view of a syringe in its disconnected relationship to the catheter opening.
Figure 9:
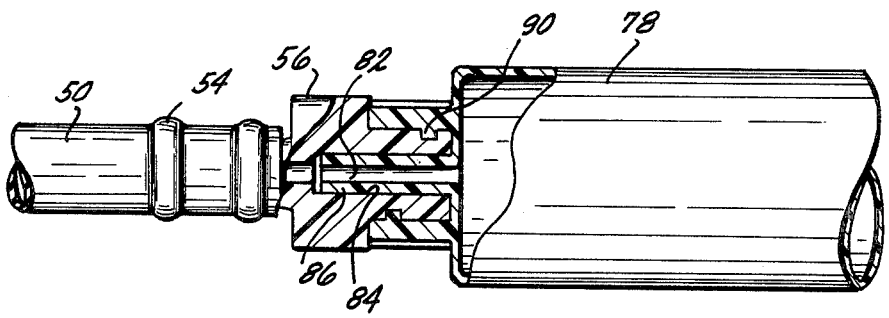
FIG. 9 shows a sectional view of a syringe in its locked position on the catheter opening; and, FIG. 10 shows a detailed view of the locking device as seen in the direction of circle 10 of FIG. 7 and of the locking cap shown in FIG. 4.
Figure 10:
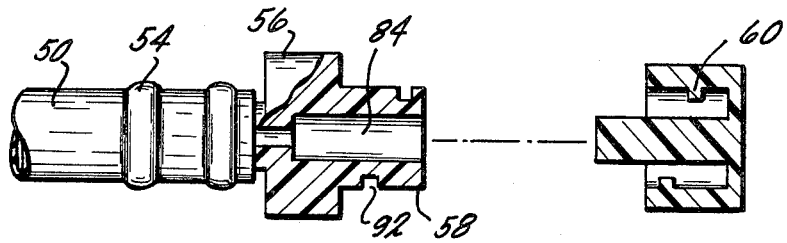

Looking more specifically at FIGS. 1, 2 and 3 and the ancillary figures related thereto, it can be seen that a patient 10 has been shown wearing the trainer of this invention. The trainer is specifically comprised of a major vest portion 12 or bib. The vest portion or bib has a collar opening 14.

The collar opening 14 is formed by two collar straps 16 and 18. The collar straps 16 and 18 include a securement means 20. The securement means 20 is formed as a series of tangs 22 on a piece of material 24 attached to the left hand collar strap 18.

The right hand collar strap 16 has a bulked plastic material that attaches to or is caught by the tangs 22.

The foregoing collar formed by the left and right hand collar straps 18 and 16 respectively support the vest, chest shield or bib in an adjustable manner. This is due to the ability of the attachments 24 and 26 being adjusted along their length so as to raise or lower the bib or shield 12.

The bib or shield 12 has a lower or main shield portion 28. The lower or main shield portion 28 is attached around a user's waist by means of a waist band 30. The waist band 30 is attached at one point of the shield 12 by means of a tab 32 stitched by stitches 34 to a band member that comprises the waist band 30.

The waist band 30 terminates in bulked attachment material 36 that is stitched by stitches 38 to the band 30.

The bulked material 36 attaches to tangs 40 on a tab 42. Tangs and bulked material sold under the trademark Velcro are representative of the attachment material which may be used.

The length of the bulked material 36 allows for adjustable attachment against the tangs 40 on the tab 42. Thus, the entire dimension of the waist band 30 can be changed by placing the bulked material 36 at different portions in attached relationship to the tangs 40 on the tab 42. This allows for adjustability to various waist sizes.

A storage pouch 44 is shown attached to the back of the main lower bib portion 28. The storage pouch 44 is for purposes of storing the various training materials that are used with the trainer as will be described hereinafter.

A training catheter 46 is shown. The training catheter is made of a silastic material. The silastic material is a clear silastic rubber which can be seen through. This allow for a person being trained to acquire the skills necessary to use home parenteral nutrition.

The silastic catheter 46 has a rubber reinforcing sleeve 50. The rubber reinforcing sleeve 50 is such that it allows for the implacement of a male fitting 52 within the sleeve 50, and in interconnected relationship to the catheter 46.

The male fitting 52 comprises a series of ridges 54 which allow the fitting to fit tightly within the catheter 46.

The ridges 54 and the male fitting 52 can be inserted in any particular manner or connected in any particular manner so long as they perform the function of a tight fitting.

The male fitting 52 further comprises a knurled flanged gripping surface 56. This flange 56 terminates in a male threaded fitting 58. The male threaded fitting is referred to as a male Luer-Lok in the art. The male Luer-Lok fitting 58 is specifically oriented to provide for the receipt of a female cap 60 thereover. The female cap 60 has a knurled configuration and is allowed to thread downwardly onto the male fitting 58. The female cap 60 also has the threaded relationship known as a Luer-Lok fitting in the trade.

The foregoing Luer-Lok fitting is fundamentally a quick disconnect and attachment means. The threads are specifically oriented for a quick single twist type of connection. Once the connection is made, it allows for a relatively fluid tight relationship for relatively low pressures.

Regardless of the foregoing, such quick connection and disconnect can be utilized, allowing for fluid connected relationship.

The catheter 46 extends approximately thirty inches outside of the front of the lower portion 28 of the vest through an opening therein. The catheter terminates in a flared fitting 62. The flared fitting 62 overlies a tubular member 64 that is adhered to a plastic bag 66. The plastic bag 66 is comprised of a heat set plastic bag that has been crimped at the corners, such as corner 68 in a crimped heat-set manner. Furthermore, the edges of the bag have been crimped and heat-set to provide for holding fluid in an opening 70.

The opening 70 in the bag terminates in a tubular member 72 having a cap 74 with a tab 76 thereon.

The cap 74 with the tab 76 allows for removal from the tubular member 72 so as to allow the contents in the bag opening 70 to be withdrawn therefrom.

The bag can be implaced in the pouch 44 or held in any other manner so long as it receives the training fluid hereinafter.

In order to practice and train with the trainer of this invention, a syringe 78 is shown. The syringe 78 has a plunger 80 like a standard syringe to drive fluid through an opening 82.

The syringe opening 82 can be implaced against an opening 84 of the Luer-Lok. The Luer-Lok opening 84 allows for receipt of a male portion 86 of the syringe.

The male portion 86 of the syringe is inserted within the opening 84 and locked in place by the lands 90 of the syringe threaded onto the grooves 92 of the Luer-Lok fitting. The grooves 92 receive the lands 90 of the syringe 78 and allow for a gripping thereof in a manner so that fluid can be inserted into the opening 84.

The use of the trainer is initiated when the training shield 12 with the collar opening 14 is implaced over one's head. After it is implaced, the waistband 30 is adjusted around a user's body.

The catheter 46 exits the chest area or shield and is capped by the female Luer-Lok fitting 60 over the male knurled fitting 58.

Initially, the catheter tubing 46 and fluid receptacle 66 are moved from the pouch 44. The capped end of the training catheter 46 is positioned similar to where the patient's actual implanted indwelling catheter would be through which the parenteral nutrition solution is to be infused.

The catheter 46 and fluid receptacle 66 are allowed to hang freely from behind the shield 12 to provide for the accurate demonstration of fluid flow during the clamping, heparinizing, irrigating and capping exercises.

An amount of water soluble dye is added to bacterial static sterile water or saline in a syringe 78. This effectively is used as a training solution. The color stains on the patient's fingers or on the work surfaces of the shield 12 are an indication of poor asceptic technique and helps to train the patient. The patient can determine from a view of the clear silastic catheter 46 as to what is happening.

The patient with the bib or shield 12 in place can then be instructed in the appropriate procedures for applying an occlusive dressing to the catheter exit site. The patient can also be shown the proper clamping technique for connecting and disconnecting the catheter 46 by means of a hemostat that has been padded so as to avoid breakage or undue trauma to the catheter 46.

The patient is also instructed in the utilization of the heparinizing solution by virtue of drawing it into the syringe 78. The syringe 78 is then attached to the male fitting 58 of the Luer-Lok attached to the catheter 46. The solution is then demonstrably injected into the catheter 46 to show the patient the right technique. This allows the syringe 78 to function in the same manner that the patient would use it in during the actual heparinizing technique. Furthermore, the patient can then use the hemostat to clamp the catheter 46 in the manner normally utilized.

Afterwards, the patient learns to cap the catheter male fitting 58 by means of the cap 60 after the syringe 78 has been utilized in conjunction therewith. Furthermore, the patient is shown how to connect and disconnect the fluid administration tubing from the pump to the male Luer-Lok fitting 58 after removal of the cap 60. Finally, the patient is shown how to irrigate the catheter properly with the utilization of the syringe 78 as it is attached to the grooves 92 of the male Luer-Lok fitting 58 by means of the flange 90.

On balance, the entire training device provides for a complete training of the patient through the utilization of the syringe 78, the catheter 46, the fittings, and the implacement of the fluid within the catheter that drains into the opening 70 of the bag. After the bag opening 70 has been filled, it can be drained by pulling the tab 76 of the cap 74 so as to allow the fluid within the opening 70 that has been inserted by the syringe 78 to drain therefrom. This allows for the drainage and utilization of the bag 66 on a continuous basis over an extended period of time in order to train the patient.

As can be seen, the invention is a substantial step over the prior art, insofar as it provides for the training of a patient utilizing home parenteral nutrition techniques. If not for the training, the patient might not utilize the syringe 78 properly with the fitting 86 being placed into the fitting 84, as well as the seating of the Luer-Lok of the respective fittings 58 and the syringe 78. Additionally, the asceptic technique for utilizing the home parenteral nutrition catheter in conjunction with a sterile dressing as it exits and enters the body, would not be shown to a patient.

Thus, the entire training of a patient can be undertaken by the invention at hand to provide for home parenteral nutrition feeding for better health and longevity of the patient. As a consequence, this invention should be read broadly over the prior art as to its teaching techniques and its ability to function as a trainer for the utilization of a patient of home parenteral nutrition.

What is claimed is:

1. A parenteral nutrition training device for utilization by a person for whom parenteral nutrition feeding is going to take place comprising:
   a shield for overlying at least in part a person's chest area;
   means for holding said shield on one's chest area;
   a catheter extending from said shield having an extended tubular portion thereof terminating in a closure means in order to close said catheter; and,
   receptacle means attached distally from said closure means to said catheter for flow connection from said catheter into said receptacle means so that fluids injected into said catheter can be received in said receptacle means.

2. The parenteral nutrition training device as claimed in claim 1 further comprising:

a collar attached to said shield for supporting said shield.

3. The parenteral nutrition training device as claimed in claim 2 wherein:
said collar comprises collar straps which are adjustable for adjustability around the neck of a user.

4. The parenteral nutrition training device as claimed in claim 3 further comprising:
a waistband for securing said shield around a user's waist.

5. The parenteral nutrition training device as claimed in claim 4 having closure means comprising:
a threaded male terminal attached to said catheter; and,
a female threaded cap in order to be seated on said male cap member.

6. The parenteral nutrition training device as claimed in claim 5 further comprising:
a waterproof bag forming said receptacle into which said catheter drains.

7. The parenteral nutrition training device as claimed in claim 6 further comprising:
opening means in order to remove fluid from said bag into which fluid has flowed from said catheter.

8. The parenteral nutrition training device as claimed in claim 7 further comprising:
an adjustable collar band formed with a securement means; and,
an adjustable waistband formed with a securement means.

9. The parenteral nutrition training device as claimed in claim 8 further comprising:
a pouch attached to said shield.

10. The combination of a syringe and parenteral nutrition training device for purposes of training a prospective user of parenteral nutrition comprising:
a shield suitable for attachment to cover a portion of a person's upper body;
attachment means for holding said shield to a person's upper body;
a catheter exiting said shield and terminating outside of said shield in a closure means which can be opened and connected to a source of fluid; and,
a syringe matched for connection to said connection means for allowing the flow of fluid from said syringe through said connection means into said catheter.

11. The combination as claimed in claim 10 further comprising:
collar bands attached to said shield comprising a portion of said attachment means for said training device.

12. The combination as claimed in claim 11 further comprising:
a waistband for securing said training shield to a user's body.

13. The combination as claimed in claim 10 wherein:
said catheter terminates distally from said connection means into a receptacle.

14. The combination as claimed in claim 13 wherein:
said syringe has lands and grooves; and,
said connection means has lands and grooves for receiving the lands and grooves of said syringe so that one can be threadedly connected to the other.

15. The combination as claimed in claim 14 further comprising:
a quick connection series of threads forming said lands and grooves respectively of said syringe and said connection means.

16. The combination as claimed in claim 15 further comprising:
a female cap for overlying said connection means in a like threaded relationship as said syringe.

17. The combination as claimed in claim 16 further comprising:
adjustment means for adjusting the collar and the waistband of said shield.
parenteral nutrition feeding training 18. A parenteral nutrition feeding training device comprising:
a bib formed as a shield having a collar portion with a collar opening and collar straps for securement around one's neck;
a waistband attached to said shield at the lower portion thereof;
means for adjusting said collar straps and said waistband for adjusting said shield with respect to a person's torso;
a catheter extending from the frontal portion of said shield terminating at one end in a male quick threading connection means;
a receptacle connected to said catheter remote from where said male connection means is for receiving fluid from said male connection means;
cap means for threadedly connecting said cap onto said male connection means;
drainage means connected to said receptacle for allowing fluid to flow therefrom that has been received from said catheter; and,
a pouch on said shield for receipt of said bag and said catheter.

19. The training shield as claimed in claim 18 wherein:
said male connection means and cap have a quick threaded relationship adapted for receipt of a syringe thereon; and wherein,
said shield is made from a plastic material and said receptacle is made from a plastic material; and further comprising,
silastic rubber material out of which said catheter is made.

* * * * *